Patented May 16, 1950

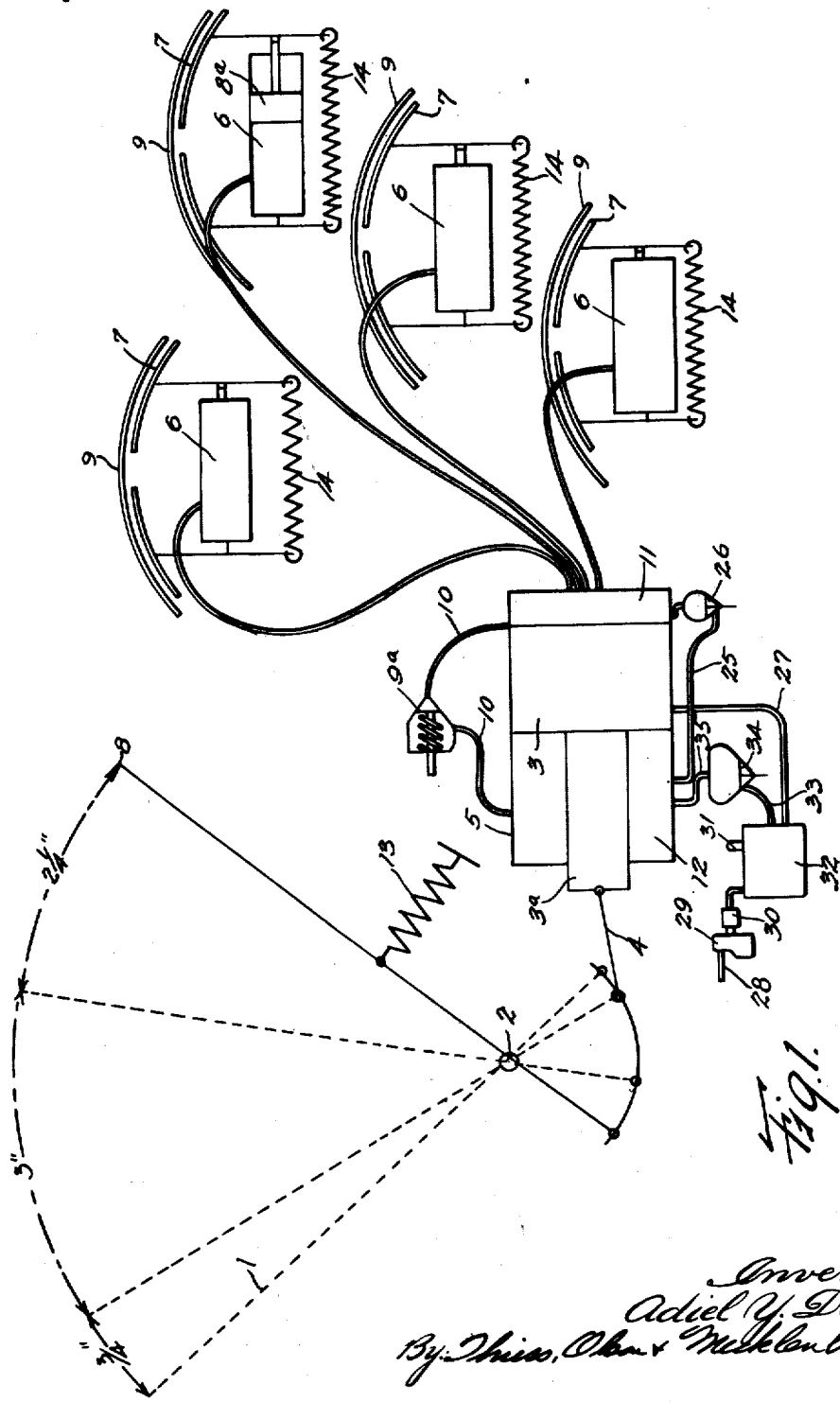

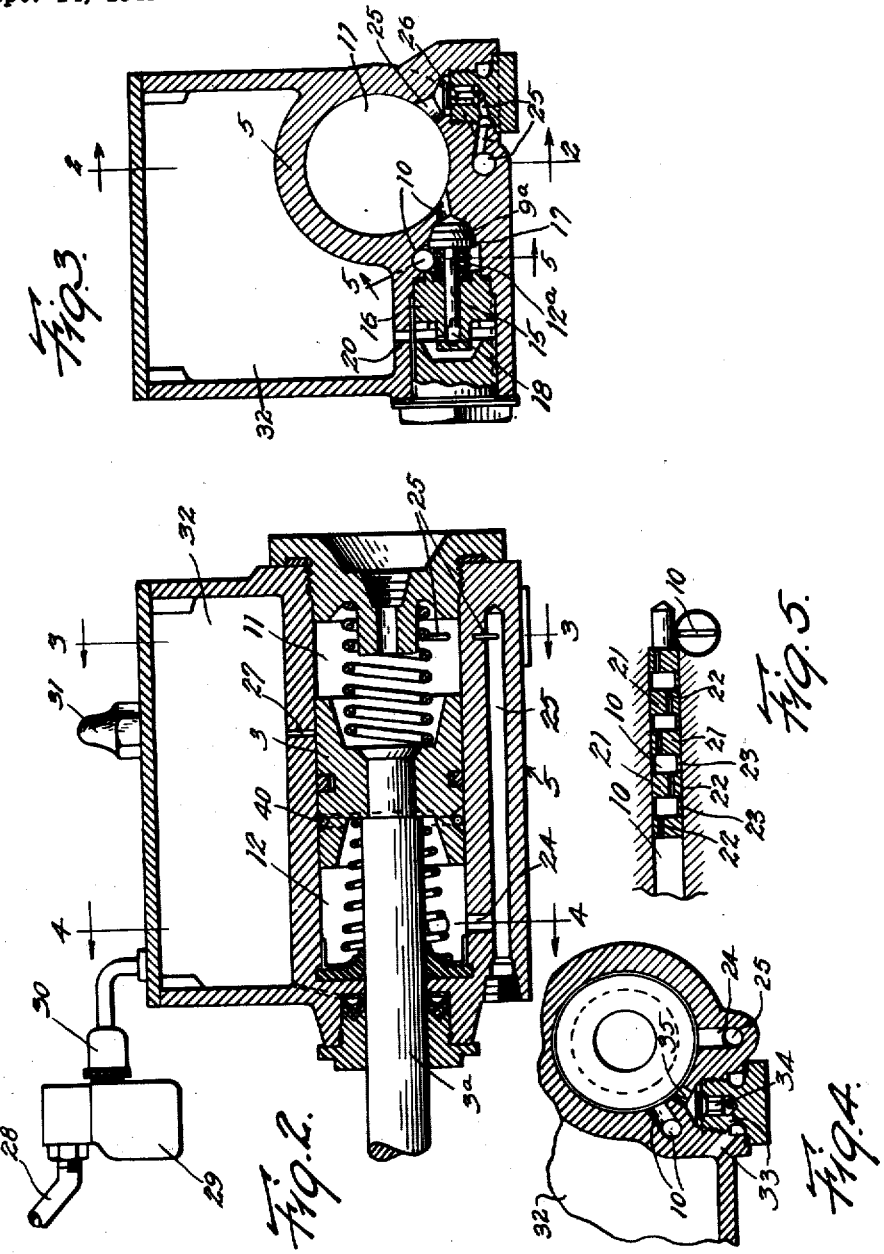

2,507,663

UNITED STATES PATENT OFFICE 2,507,663

COMPOUND MASTER CYLINDER

Adiel Y. Dodge, Rockford, Ill.

Application September 14, 1945, Serial No. 616,288

5 Claims. (Cl. 60—54.6)

My invention relates to hydraulic brake applying apparatus.

One of the objects of my invention is to provide improved hydraulic brake applying apparatus having at least two stages of brake applying movement, the first stage effecting a relatively quick clearance take-up and the second stage effecting a relatively slow forceful brake applying movement, in which the transition from one stage to another will not interfere with the controllability of the brake or greatly affect the "feel" or change in resistance of the brake pedal.

A further object is to provide means to compensate for suddenly applied pressure on the brake pedal in the differential type master cylinder. A sudden application of pressure has a tendency to open the differential valve controlling communication between opposite sides of the piston prematurely.

A further object is to secure the proper proportion between the fluid pressure opening area of the differential valve and the fluid pressure closing area so that the most sudden break in the "pedal pressure versus deceleration" curve will occur at low rates of decleration.

A further object is to provide an improved hydraulic brake applying apparatus which will hinder the sudden application of pressure on the brake pedal from effecting a transition from rapid clearance take-up movement to slow powerful brake applying movement at too early a stage.

A further object of my invention is to provide an improved hydraulic brake applying apparatus in which the soft piston packing does not cross any port or interruption in the smooth cylinder wall.

A further object is to provide an improved differential piston, differential valve type of pedal actuated master cylinder for brakes in which, during a first stage of differential piston action, the differential valve, after opening, will close when a definite ratio between the pressure in the front and rear of the piston has been established and in which, during a later stage of differential piston action, the differential valve will remain open to maintain the pressure equal on both faces of the piston and in which, during the first stage as well as during the second, the pedal pressure required increases as the braking effect increases.

Further objects and advantages of the invention will be apparent from the description and claims.

In the drawings, in which my invention is illustrated,

Figure 1 is a diagrammatic view showing my brake applying apparatus in conjunction with the hydraulic brake actuators;

Fig. 2 is an axial sectional view of the master cylinder on the line 2—2 of Fig. 3;

Fig. 3 is a transverse sectional view on the line 3—3 of Fig. 2;

Fig. 4 is a transverse sectional view on the line 4—4 of Fig. 2;

Fig. 5 is a longitudinal sectional view on the line 5—5 of Fig. 3;

Figure 6:
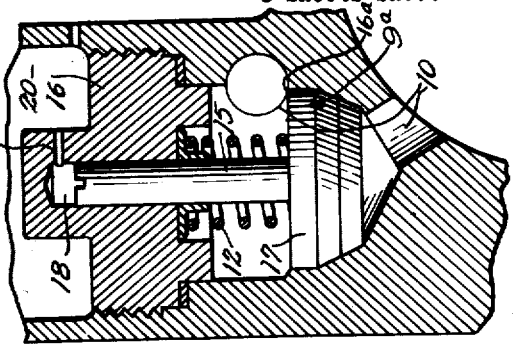
Fig. 6 is an enlarged sectional view showing the differential valve.

Referring to the drawings in detail, the construction shown comprises a pedal 1, shown diagrammatically in Fig. 1, pivotally mounted at 2, a master piston 3, the piston rod 3ᵃ of which is pivotally connected with the pedal by means of a link 4, a master cylinder 5 in which the piston operates, and four hydraulic brake actuators 6, one for each of the four wheels of the vehicle for applying the brakes 7 when pressure is applied to the pedal at 8.

The brake applying apparatus is designed to provide three stages of brake actuation—(1) a low pressure, high speed brake actuating movement for taking up the slack between the brake and the brake drum 9; (2) a high pressure, low speed movement for creating pressure between the brake and brake drum, and (3) a low pressure, high speed final brake applying movement to provide a safety feature in the event that excess wear of brakes or the loss of fluid has occurred and because thereof the previous movement has not caused sufficient braking pressure.

The transition from high speed, low pressure clearance take-up to low speed, high pressure braking movement is effected by means of a spring pressed differential valve 9ᵃ located in a passageway 10 affording communication between the cylinder chamber 11 in front of the piston and the cylinder chamber 12 behind the piston. When the pressure in the chamber 11 in front of the piston 3 becomes sufficient to open this valve 9ᵃ against the closing pressure of the spring 12ᵃ, it opens communication between opposite sides of the piston 3, allowing fluid to flow from the front chamber 11 to the rear chamber 12. When the two chambers are thus in communication, the resisting hydraulic force acting on the front face of the piston is opposed by the hydraulic pressure on the rear face of the differential piston which is added to the manual pressure exerted on the piston rod by the pedal.

In order to provide a stage of braking movement in which the full force increasing ratio of the differential piston is made available, it is necessary that after a certain stage of fluid pressure has been reached the differential valve will remain open as the pedal pressure is increased. In order to provide some correspondence between the pedal pressure required and deceleration produced during the second stage of braking action, thus avoiding a completely uncontrollable system, it is necessary that the amount of pedal pressure required shall increase with the amount of deceleration desired.

To accomplish this, I design the valve 9ᵃ so that the fluid pressure opening area of the valve is greater than the fluid pressure closing area, and provide the spring 12 to assist in the closing movement, these relative areas and spring force being determined from certain equations as pointed out later. I achieve this relatively smaller fluid pressure closing area by providing the valve with a stem 15 which is slidable in the bushing 16 threaded into the cylinder casing. With this construction, the fluid pressure opening area is the area of the circle at the line of closure at 16ª between the valve and its seat, and the fluid pressure closing area is equal to the area of this circle minus the cross-sectional area of the valve stem 15.

With this design, when the pressure on the pedal 1 at 8 and the resistance to movement of the brakes cause the fluid pressure in front of the master piston 3 to reach a certain value, the valve opening pressure on the valve 9ª will overcome the valve closing action of the spring 12 and the valve will open, creating a valve closing fluid pressure on the valve. Thereafter, for any definite amount of increased pressure on the pedal, there will be a definite determinable pressure ratio between the fluid pressure valve opening force and the fluid pressure valve closing force, at which the valve will again seat itself, up to a certain stage of pedal pressure. After this certain stage of pressure has been reached, an increase in pedal pressure will increase the hydraulic forces acting but will not result in a closing of the valve.

As explained mathematically hereinafter, the valve will begin its opening and closing action when the fluid pressure on the valve is sufficient to overcome the valve closing effect of the spring, but the valve will not remain constantly open until the pressure per square inch in front of the piston is equal to the pressure per square inch on the rear of the piston.

In order to make available a final low pressure large movement of the brake applying actuators 6 in case sufficient braking pressure has not been applied prior to the final movement of the pedal 1 due to excessive free movement of the piston 3, I position the portion of the passageway 10 leading from the cylinder chamber 11 so that the piston 3, toward the end of its movement, will close this portion of the passageway and prevent any further flow of liquid from the chamber 11 to the chamber 12. Further movement of the piston will necessarily force all of the liquid displaced from the chamber 11 into the brake actuators, causing relatively high speed, low pressure movement of these actuators to insure further application of brake pressure.

In general, I have found that a complete pedal movement of six inches gives satisfactory results in effecting all three stages of pedal movement, the maximum pedal movement for the first stage occurring with worn lining being about 2¼ inches; the pedal movement for the second stage being about three inches, and the pedal movement for the third stage being about ¾ inch. I have found that a tangential or circumferential movement of the ends of the brake band with respect to each other of about .45 inch will suffice to take up the greater clearance or slack between the brake band and brake drum occurring during the last stages of brake lining life and that a final tangential or circumferential movement of the brake band ends of about .125 inch will suffice to enable any rate of deceleration from zero to 30 ft./sec.$^2$. I have found that the following give satisfactory results:

A mechanical advantage of 24:1 between the pedal movement and the high pressure tangential or circumferential brake applying movement;

A diameter of one inch for the brake applying actuator pistons 8ª, and

A ratio of pedal movement to master pinion movement of 3.375:1.

Assuming the above values, it can be determined mathematically that in order for a 2¼-inch movement of the brake pedal to cause a .45-inch movement of the brake band ends, the diameter of the master cylinder piston should be 1.64 inches and its area 2.125 square inches, and that in order for three inches of pedal movement to effect the slow speed, high pressure movement of the brake actuators to cause a circumferential movement of the brake band ends relative to each other of ⅛ inch, the diameter of the piston rod should be .75 inch and its cross-sectional area .4418 square inch.

The net hydraulic force acting on the rear face of the piston (which may be termed the differential piston) is the pressure in pounds per square inch times the difference in area of the piston face and the cross-sectional area of the piston rod, or 1.683 square inches.

The comparative performances of the brake cylinder disclosed in this application with certain other types is shown in the drawings and in the chart (Fig. 7) and in the following performance table used in preparing the chart.

| #1 | #2 | #3 | #4 | #5 | #6 | #7 | #8 | #9 | #10 | #11 | #12 |
|---|---|---|---|---|---|---|---|---|---|---|---|
| Decel Ft. Sec.$^2$ | Net Force on Brake Ends, Lbs. | Force of of Brake Relieving Springs, Lb. | Gross Force on Brake Pistons, Lb. | Line Pres P. s. i. $P_1$ | Hyd Force on Large Piston | P. s. i. in Aux Cyl. $P_2$ See Diff Valve | Hyd. Force on Diff. Piston | Manual Force on Master Pist Rod | Net Pedal Force, Lb. | Spring | Nominal Gross Pedal Force, Lb. |
| | #4 − #3 Spring | | #2 + #3 Spring | #4 / .7854 | #5 × 2.125 | | #7 × 1.6832 | | (6# − 8) | #9/3.375 | | #10 + #11 Spring |
| 0. | 0 | 40 | 40 | 51 | 108.3 | 0 | 0 | 108.3 | 32 | 4 | 36 |
| .5 | | | | | | | | | | | 51.8 |
| 1 | 26 | 46 | 72 | 92.6 | 196.7 | .1 | .166 | 196.5 | 58 | 6 | 64 |
| 2 | | | | | | | | | | | 66 |
| 5 | | | | | | | | | | | 71 |
| 10 | | | | | | | | | | | 80 |
| 15 | | | | | | | | | | | 87.3 |
| 17 | 442 | 49 | 491 | 625 | 1,328 | 625 | 1,052 | 276 | 81.5 | 8.5 | 89 |
| 20 | | | | | | | | | | | 104.5 |
| 25 | | | | | | | | | | | 127 |
| 30 | | | | | | | | | | | 149 |
| SIGNAL AND SAFETY FEATURE—PISTON PAST SAFETY PORT | | | | | | | | | | | |
| 10 | | | | | | | | | | | 257 |
| 15 | | | | | | | | | | | 364 |
| 20 | | | | | | | | | | | 472.5 |

Large piston area = 2.125. Small piston area = .4418. Valve head = .162 sq. in. Valve stem = .024 sq. in.

It will be shown that for any definite pressure on the pedal there will be a corresponding force tending to separate the ends of the brake bands and consequently a corresponding deceleration in feet per second squared, or vice versa, that for any definite deceleration in feet per second squared there will be a corresponding pedal pressure required.

In arriving at the formulas or equations for computing the pedal pressure required for a given deceleration, certain variables in the performance table must be taken into account, as follows:

Column No. 1.—The deceleration in ft./sec.$^2$;

Column No. 2.—The net force on the brake ends in pounds;

Column No. 3.—The force in pounds of the brake relieving springs 14;

Column No. 4.—The gross force on the brake actuator pistons;

Column No. 5.—The pressure in #/sq. in. in front of the master piston and in the brake actuating cylinders;

Column No. 6.—The force due to pressure in front of the master piston;

Column No. 7.—The pressure per square inch on the rear side of the master piston (auxiliary cylinder);

Column No. 8.—The force in pounds on the differential piston;

Column No. 9.—The manual force exerted on the piston rod;

Column No. 10.—The net force exerted on the pedal;

Column No. 11.—The force in pounds exerted by the pedal returning spring 13; and Column No. 12.—The gross force in pounds exerted on the pedal.

Before making the computations necessary in filling out this table, it is necessary to find the value of the pressure behind the master piston in terms of the pressure in front of the master piston, as determined by the ratio of the fluid pressure opening area of the valve to the fluid pressure closing area and to the strength of the spring 12. I have found that with the assumed one-inch diameter brake applying pistons and the 1.64-inch diameter of the master cylinder piston, a fluid pressure opening area of the valve 9$^a$ of .162 sq. in. and a fluid pressure closing area of .138 sq. in., with a valve spring force of 15 pounds, give satisfactory results. Designating the pressure in front of the master piston as $P_1$, liquid pressure on the back of the piston as $P_2$, the fluid pressure valve opening area as $a_1$, the fluid pressure valve closing area as $a_2$, and the spring pressure as $Fs$, we have the equation: $P_2 \times a_2 = P_1 \times a_1 - Fs$. Substituting values for $a_1$, $a_2$ and $Fs$, we have the equation $$P_2 = P_1 \times 1.173 - 108.5$$

Referring now to the performance table, assume that it is desired to find the gross pedal pressure required to effect the various decelerations expressed in the first column of the table. The values expressed in columns 3 and 11 are arbitrary, depending upon the kind of springs used. However, the values of the spring forces indicated have been found satisfactory.

In general, it may be assumed that the values in column 2 in pounds force on brake band ends are twenty-six times the values in column 1 in deceleration in feet per second squared. As indicated above, in column 3, the values for the pound force of the brake returning spring are arbitrary. The gross force on the brake pistons (column 4) is obviously the sum of the corresponding figures of columns 2 and 3. The line pressure per square inch in front of the master piston (column 5) is obviously the value expressed in column 4, divided by the area of the brake actuator piston 8$^a$ (.784 sq. in.). The hydraulic force acting on the front of the master piston (column 6) is the product of the line pressure in column 5 times the area of the master piston (2.125 sq. in.). The pressure per square inch in the auxiliary cylinder is calculated from this equation $P_2 = (P_1 \times 1.173) - 108.5$, using the designated value for $P_1$ in column 5. The hydraulic force in pounds on the differential piston (column 8) is the value for $P_2$ as given in column 7, times the difference in area between the master piston face and the cross-sectional area of the piston rod, which difference equals 1.683 square inches. The manual force required on the master piston rod (column 9) is the difference between the hydraulic force acting on the large piston, expressed in column 6, and the hydraulic force on the differential piston expressed in column 8. The net pedal force in pounds (column 10) is the manual force on the master piston rod as expressed in column 9, divided by the ratio of movement of the pedal with respect to the master piston movement (3.375). The values indicated in column 11 for the force of the pedal returning spring are empirical as indicated above. The nominal gross pedal pressure expressed in column 12 is obviously the sum of the net pedal pressure expressed in column 10, plus the empirical spring pressure value in column 11. Using the above equations and formulas, it is found that the gross pedal forces required for the indicated deceleration values in column 1 are as indicated in column 12.

Figure 7:
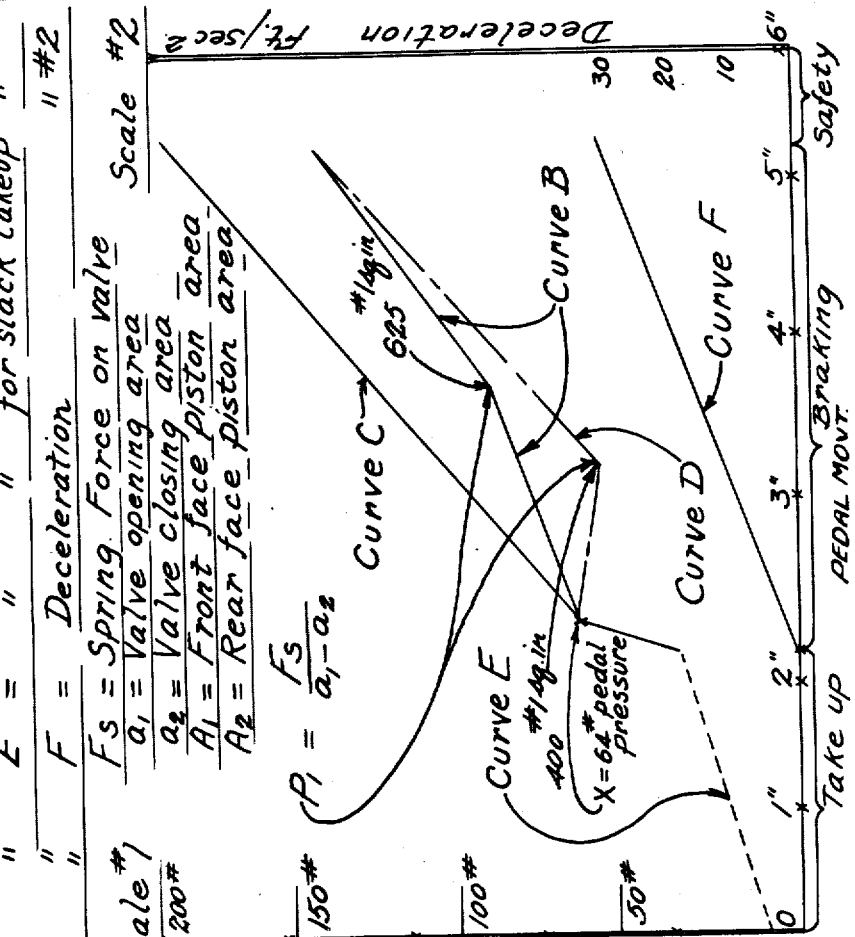
Fig. 7 is a chart with curves showing the relative values for certain variables.

Fig. 7 shows certain curves plotted against pedal movement in inches. Pedal movement in inches is divided into three sections, (1) a slack take-up movement of 0:2¼ inch; (2) a brake applying movement of 3 inches, and (3) an emergency safety movement of three-fourths of an inch.

In this chart, the curve B, plotted against the pedal pressure scale #1 and the corresponding deceleration curve F, plotted against the deceleration scale #2, indicate performance of the apparatus described in this application, in which $A_1 = 2.12$, $A_2 = 1.68$, $a_1 = .162$ and $a_2 = 1.38$, from which it follows that $$\frac{A_1}{A_2} > \frac{a_1}{a_2}$$

The pedal pressure curve C indicates the pedal pressures required to give the deceleration curve F with a construction in which the fluid pressure opening area $a_1$ of the valve is equal to the fluid pressure closing area $a_2$ of the valve as shown, for example in my prior Patent No. 2,340,113 an area of .162 sq. in. is assumed.

The pedal pressure curve D indicates the pedal pressures required to give the deceleration curve F in a construction in which $A_1 = 2.125$, $A_2 = 1.68$, $a_1 = .162$, and $a_2 = .124$, from which it follows that $$\frac{A_1}{A_2} < \frac{a_1}{a_2}$$

In all three curves a spring force $Fs = 15$ lbs. is assumed.

These curves are plotted from values which can be obtained by calculation, using the above equations, after first obtaining the values in the preceding performance table.

In order to provide some correspondence between the pedal pressure required and deceleration produced during the second stage of braking action, thus avoiding a completely uncontrollable system, it is necessary that the amount of pedal pressure required shall increase with the amount of deceleration desired. To accomplish this, it will be shown that it is necessary that $a_1/a_2$ shall be less than $A_1/A_2$.

In order to provide a stage of braking movement in which the full force increasing ratio of the differential piston is made available, it is necessary that after a certain stage of fluid pressure has been reached the differential valve will remain open as the pedal pressure is increased. This stage is reached if, at some point of the pedal movement, $$P_1 = \frac{Fs}{a_1 - a_2}$$

as shown hereinafter.

Taking, first, the requirement that to avoid a completely uncontrollable system it is necessary that $a_1/a_2$ shall be less than $A_1/A_2$, it must be shown that if $a_1/a_2$ is greater than $A_1/A_2$, an increase in deceleration will be accompanied by a decrease of pedal pressure required.

In studying this problem, it is obvious that when the values in column 1 in the table increase, the values in column 5 ($P_1$) also increase, the values in column 9 increase, and vice versa, and that when the values in column 12 increase, the values in column 9 increase, and vice versa. In discussing the problem, the values found in the various numbered columns are designated by the column number.

It is apparent on inspection that $\#9 = \#6 - \#8$; that $\#6 = A_1 P_1$ and that $\#8 = A_2 P_2$. Therefore, $\#9 = A_1 P_1 - A_2 P_2$. It has previously been shown that $$P_2 = P_1 \frac{a_1}{a_2} - \frac{Fs}{a_2}$$

Therefore, $$\#9 = A_1 P_1 - A_2 \left( P_1 \frac{a_1}{a_2} - \frac{Fs}{a_2} \right)$$

$$\#9 = A_1 P_1 - A_2 P_1 \frac{a_1}{a_2} + A_2 \frac{Fs}{a_2}$$

$$\#9 = P_1 \left( A_1 - A_2 \frac{a_1}{a_2} \right) + A_2 \frac{Fs}{a_2}$$

$A_2 \frac{Fs}{a_2}$ is a constant

Therefore, if factor $$\left( A_1 - A_2 \frac{a_1}{a_2} \right)$$

is positive, #9 will increase as $P_1$ increases, and if this factor is negative #9 will decrease as $P_1$ increases. If this factor is zero, #9 will remain constant as $P_1$ increases. In order for the factor to be positive $$A_1 > A_2 \frac{a_1}{a_2}$$

and $$\frac{A_1}{A_2} > \frac{a_1}{a_2}$$

Therefore, if $$\frac{A_1}{A_2} > \frac{a_1}{a_2}$$

9 will increase as $P_1$ increases.

Since, as pointed out above, deceleration #1 increases as $P_1$ (#5) increases and since gross pedal pressure #12 increases as manual force on piston rod #9 increases, it follows that gross pedal pressure #12 increases when deceleration #1 increases, if $$\frac{A_1}{A_2} > \frac{a_1}{a_2}$$

As previously stated, in order to provide a stage of braking movement in which the full force increasing ratio of the differential piston is made available, it is necessary that after a certain stage of fluid pressure has been reached, the differential valve will remain open as the pedal pressure is increased. Using the previous equation, $P_2 a_2 = P_1 a_1 - Fs$, from this it follows that $Fs = P_1 a_1 - P_2 a_2$. If the differential valve remains open, $P_2 = P_1$. Substituting $P_1$ for $P_2$ in the equation for $Fs$, it follows that $Fs = P_1 (a_1 - a_2)$ from which it follows that $$P_1 = \frac{Fs}{a_1 - a_2}$$

From this it appears that the desired full force increasing ratio of the differential piston is made available if the apparatus has such values of spring force, valve opening area and valve closing area that at some point in the brake applying action the pressure in front of the master piston will equal the spring force on the differential valve divided by the difference between the valve opening area and the valve closing area.

For any assumed values of $a_1$, $a_2$, and $Fs$, to find the value of $P_1$ beyond which the valve remains constantly open, it is to be considered that if the valve is open $P_2 = P_1$. Substituting $P_1$ for $P_2$ in the equation $P_1 a_1 - P_2 a_2 = Fs$ one finds $$P_1 = \frac{Fs}{a_1 - a_2}$$

In the B curve these assumed values are $a_1 = .162$, $a_2 = .138$, and $Fs = 15$ Therefore, for curve B this critical pressure $$P_1 = \frac{15}{.162 - .138} = 625 \text{ lbs./sq. in.}$$

This corresponds to a deceleration of 17 ft./sec.²

To plot the points on the curve B for values of $P_1$ higher than 625 lbs./sq. in., the equation $P_2 = P_1$ and the previous equations are used.

For the curve D, the critical pressure $$P_1 = \frac{15}{.162 - .124} = 400 \text{ lbs./sq. in.}$$

This corresponds to a deceleration of about 10 ft./sec.²

To plot points on the curve D for values of $P_1$ higher than 400 lbs./sq. in., use the equation $P_2 = P_1$ and the previous equations. The curves in the chart Fig. 7 are roughly within the tolerance of slide rule calculations, and illustrate the trends and the relations of the curves to each other.

To plot the curve C in which $a_1 = a_2 = .162$ in. and $Fs = 15$ lbs. the valve and spring are considered as a pressure reducing valve, which will maintain $P_2$ less than $P_1$ by a definite amount. When this valve is balanced $P_1 a_1 = P_2 a_2 + Fs$. Therefore $.162 P_1 = .162 P_2 + 15$ and $P_1 = P_2 + 92.7$ lbs. Using these values in the above equations the curve C is obtained.

In order to prevent sudden application of pedal pressure from opening the valve 9c prematurely, I provide this valve with a cylindrical portion 17 which fits into a cylindrical portion of the valve casing when the valve is closed so that there is very little port opening until the cylindrical portion of the valve is completely out of the cylindrical recess in the casing. As a further precaution, I provide a dash pot construction to control the opening movement of the valve. For this purpose the valve stand 15 extends into a dash pot chamber 18 from which restricted openings 19 and 20 lead to the low pressure side of the system. As a further precaution, I provide labyrinthine passage restriction in the passage 10 shown in Fig. 5. This labyrinthine construction may be provided by slipping into the passage 10 small cylinders 21, each having a restricted opening 22, these cylinders alternating with cylindrical shells 23 so that each restriction is followed by a rather large chamber into which the jet of liquid discharges resulting in turbulence and retarded flow.

When the pedal pressure is released, the springs 14 draw the ends of the brake bands 7 together forcing liquid back from the cylinders 6 into the master cylinder 5 in front of the piston 3. The pressure of this liquid plus the pedal returning action of the spring 13 moves the piston 3 toward withdrawing position. Any deficiency in liquid supplied to the chamber 11 of the master cylinder 5 from the brake actuating cylinder 6 is made up by liquid supplied from the low pressure side of the piston through the port 24 and passage 25, past the check valve 26 to the chamber 11 in front of the piston 3. When the piston is in fully withdrawn position, the front edge of the piston uncovers the port 27 to permit the supply of liquid to the cylinder chamber 11 directly from the reservoir.

It is sometimes desirable that a light fluid pressure be applied to the liquid in the reservoir. For this purpose I provide a connection from the exhaust manifold opening into the reservoir above the liquid level therein. Referring to Fig. 2, the construction shown for this purpose comprises a tube 28 connected with the exhaust manifold, a trap 29 into which this tube leads for separating foreign material, and a check valve 30 for preventing return flow of the gas delivered from the exhaust manifold. In order to prevent excessive pressure in the liquid reservoir, I provide a relief or safety valve 31 which may be set so as to release pressure at a relatively low amount, perhaps three or four pounds' pressure.

Flow from the reservoir 32 to the rear chamber 12 is through the passage 33 (Figs. 1 and 4) past the check valve 34, and through the passage 35.

It will be seen that there are two ports 27 and 35 opening into the front and rear cylinders 11 and 12, respectively, from the reservoir 32, both of which are alternately opened and closed by movement of the piston 3 and that there are two check valve-controlled ported passages 10 and 25 opening into both the front chamber 11 and the rear chamber 12, the passage 10 connecting the front and rear chambers for flow from front to rear, and the passage 25 connecting the front and rear chambers for flow from rear to front, the ports for these passages also being alternately opened and closed by movement of the piston. The construction is so designed that the soft piston packing 40 does not cross any of these six ports in the movement of the piston notwithstanding that they are all opened and closed by the piston in its movement.

The spring check valve 9ª and passages 10 connect cylinder portion 11 with cylinder portion 12 on increase of fluid pressure due to pedal application. The check valve 26 and passages 24 and 25 let the cylinder portion 11 fill from the cylinder portion 12 on pedal release. The check valve 34 and passages 33 and 35 enable flow from reservoir 32 to cylinder portion 12 on pedal application until check valve 9 opens to supply cylinder portion 11 from cylinder portion 12. The port 27 enables flow from reservoir 32 to cylinder portion 11 when the pedal is released.

Referring again to the chart Fig. 7, the point X on the curves B, C and D at which differential action of the cylinder begins is obtained as follows. As $P_1$ increases, it reaches a value at which the fluid opening pressure on the valve 9ª will overcome the valve closing effect of the spring 12. At this point $P_1 a_1 = F_s$. Substituting values .162 $P_1 = 15$ or $P_1 = 92.6$ lbs./sq. in. Referring to the table, this value of $P_1$ corresponds to a pedal pressure of 64 lbs. and a deceleration of 1 ft./sec.$^2$.

Further modifications will be apparent to those skilled in the art and it is desired, therefore, that the invention be limited only by the scope of the appended claims.

Having thus described my invention, what I claim and desire to secure by Letters Patent is:

1. A master cylinder having a differential piston and having means affording communication between the front face and the rear face of the piston, a differential valve controlling said communication and spring means tending to close said valve, the differential valve having a valve opening area exposed to the pressure created in the cylinder in front of the piston and a valve-closing area exposed to the pressure created in the cylinder in the rear of the piston the pressure effective front face of the piston being greater than the pressure effective rear face of the piston, the pressure opening valve area being greater than the pressure closing valve area, and the quotient of the front piston face area divided by the rear piston face area being greater than the quotient of the pressure opening area divided by the pressure closing valve area.

2. A master cylinder and piston construction comprising a cylinder, a piston rod and a piston secured to said rod, said cylinder having a port through which fluid is forced to a pressure-actuated actuator to which a varying resistance is opposed, said construction having a passage between the chamber on the piston rod side of the piston to the chamber on the other side of the piston, a valve port in said passage and a spring closed valve for said port in said passage opened by the rise in pressure in the chamber on said other side of said piston, said valve having a cylindrical portion fitting into a cylindrical recess of the valve port when closed and movable out of said recess when open whereby slight initial movement of the valve due to short fluctuations of pressure will not cause the cylindrical part of the valve to move out of the cylindrical portion of the valve port.

3. A master cylinder and piston construction comprising a cylinder, a piston rod and a piston secured to said rod, said cylinder having a port through which fluid is forced to a pressure-actuated actuator to which a varying resistance is opposed, said construction having a passage between the chamber on the piston rod side of the piston to the chamber on the other side of the piston, a spring closed valve in said passage opened by the rise in pressure in the chamber on said other side of said piston, and a dash pot for controlling said valve to prevent sudden application of force from opening the valve prematurely comprising a plunger actuated by said valve and a restricted orifice through which fluid is forced by said plunger.

4. A master cylinder and piston construction comprising a cylinder, a piston rod and a piston secured to said rod, said cylinder having a port through which fluid is forced to a pressure-actuated actuator to which a varying resistance is opposed, said construction having a labyrinthine passage between the chamber on the piston rod side of the piston to the chamber on the other side of the piston, and a spring closed valve in said passage opened by the rise in pressure in the chamber on said other side of said piston to prevent sudden application of force from opening the valve prematurely.

5. A master cylinder having a differential piston and having means affording communication between the front face and the rear face of the piston, a differential valve controlling said communication and spring means tending to close said valve, the differential valve having a valve opening area exposed to the pressure created in the cylinder in front of the piston and a valve-closing area exposed to the pressure created in the cylinder in the rear of the piston the pressure effective front face of the piston being greater than the pressure effective rear face of the piston, the pressure opening valve area being greater than the pressure closing valve area, and the quotient of the front piston face area divided by the rear piston face area being greater than the quotient of the pressure opening valve area divided by the pressure closing valve area, the range of movement of said piston being such that at some point in its range the pressure per unit area on the front face of the piston is equal to the spring valve closing force divided by the difference in area of the valve opening area and the valve closing area.

ADIEL Y. DODGE.

REFERENCES CITED

The following references are of record in the file of this patent:

UNITED STATES PATENTS

| Number | Name | Date |
|---|---|---|
| 1,084,715 | Steinmann | Jan. 20, 1914 |
| 1,111,556 | Bakels | Sept. 22, 1914 |
| 1,695,194 | Lansinger | Dec. 11, 1928 |
| 1,819,482 | Pentz | Aug. 18, 1931 |
| 2,180,454 | Bowen | Nov. 21, 1939 |
| 2,184,501 | Loweke | Dec. 26, 1939 |
| 2,185,072 | Bowen | Dec. 26, 1939 |
| 2,328,683 | Schnell | Sept. 7, 1943 |
| 2,340,113 | Dodge | Jan. 25, 1944 |

FOREIGN PATENTS

| Number | Country | Date |
|---|---|---|
| 607,748 | Germany | Jan. 12, 1935 |